United States Patent
Hashimoto

(10) Patent No.: US 11,695,891 B2
(45) Date of Patent: Jul. 4, 2023

(54) READABLE STORAGE MEDIUM, INFORMATION PROCESSING APPARATUS, AND METHOD OF CONTROLLING INFORMATION PROCESSING APPARATUS

(71) Applicant: CANON KABUSHIKI KAISHA, Tokyo (JP)

(72) Inventor: Yoshinori Hashimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/715,462

(22) Filed: Apr. 7, 2022

(65) Prior Publication Data
US 2022/0337722 A1    Oct. 20, 2022

(30) Foreign Application Priority Data
Apr. 15, 2021  (JP) .................................. 2021-069206

(51) Int. Cl.
| | | |
|---|---|---|
| G06K 15/00 | (2006.01) | |
| H04N 1/387 | (2006.01) | |
| G06F 3/04842 | (2022.01) | |
| G06F 3/04845 | (2022.01) | |

(52) U.S. Cl.
CPC ....... *H04N 1/3875* (2013.01); *G06F 3/04842* (2013.01); *G06F 3/04845* (2013.01); *H04N 1/3877* (2013.01)

(58) Field of Classification Search
None
See application file for complete search history.

(56) References Cited

U.S. PATENT DOCUMENTS

| | | | | |
|---|---|---|---|---|
| 11,562,190 | B2 * | 1/2023 | Sato .................... | G06K 15/1885 |
| 2003/0147097 | A1 * | 8/2003 | Kotani ................... | G06K 15/00 358/1.18 |
| 2007/0291337 | A1 * | 12/2007 | Hibi .................... | H04N 1/00384 358/538 |
| 2010/0013950 | A1 * | 1/2010 | Kikuchi ................ | H04N 5/772 348/E5.022 |
| 2018/0341647 | A1 * | 11/2018 | Hiraishi ................ | G06F 16/00 |
| 2021/0012501 | A1 * | 1/2021 | Saito .................... | G06F 3/04842 |
| 2021/0044709 | A1 * | 2/2021 | Hashimoto ........... | G06F 3/0482 |
| 2022/0107770 | A1 * | 4/2022 | Ishida .................... | G06F 3/1288 |
| 2022/0334778 | A1 * | 10/2022 | Horiike ................. | G06F 3/1208 |

FOREIGN PATENT DOCUMENTS

JP         2010176275 A       8/2010

\* cited by examiner

*Primary Examiner* — Dung D Tran
(74) *Attorney, Agent, or Firm* — Venable LLP

(57) ABSTRACT

An object is to improve convenience for a user to lay out image data by displaying a trimming region when necessary. A non-transitory computer readable storage medium stores a program that causes a computer to function as a display control unit capable of displaying a screen having a first region in which to place an object and a second region surrounding the first region, and configured to switch to displaying or to hiding the second region in the screen according to a setting indicating whether to display or to hide the second region. In a case when the setting indicates hiding the second region, the display control unit displays the second region based on a position of the object in the first region.

21 Claims, 17 Drawing Sheets

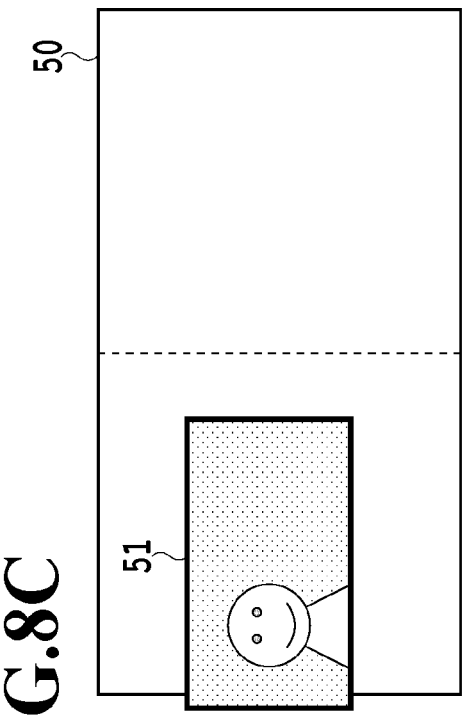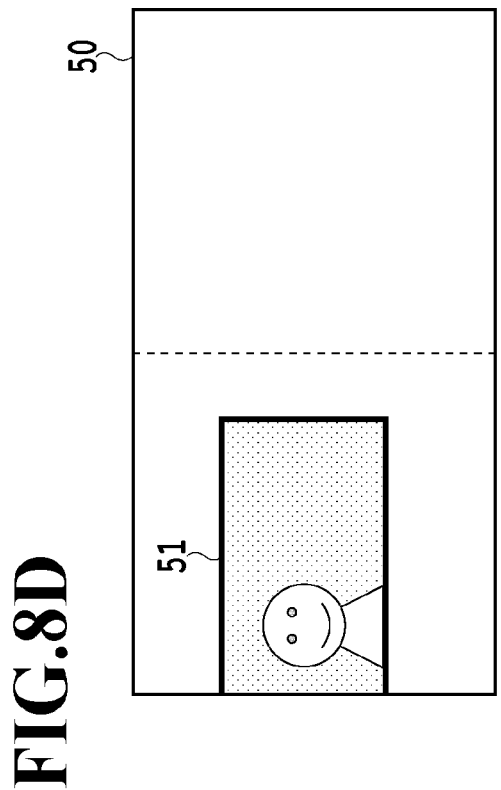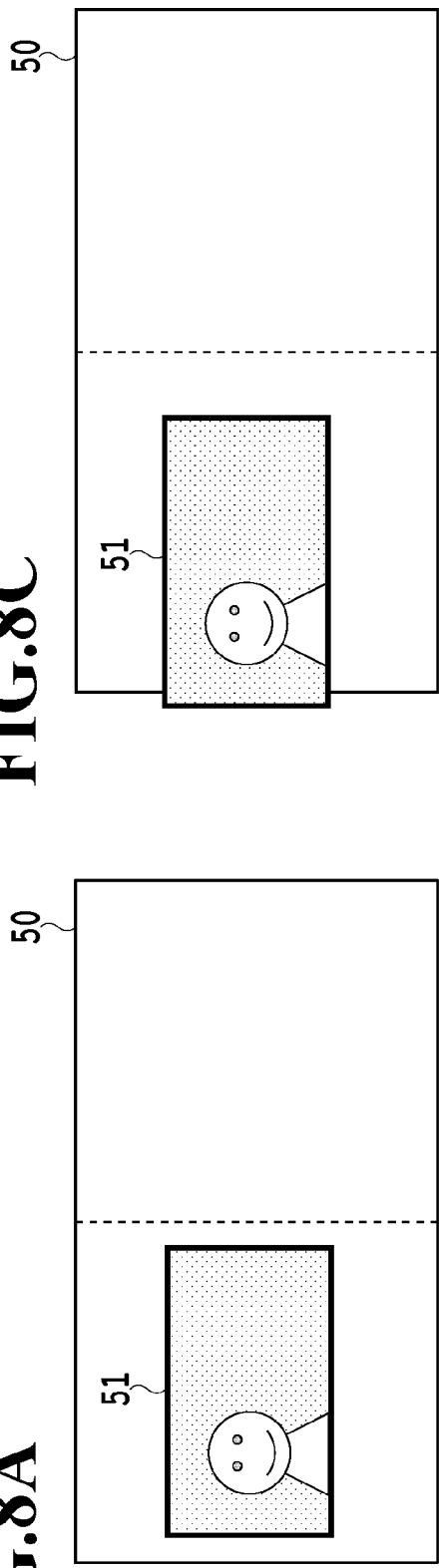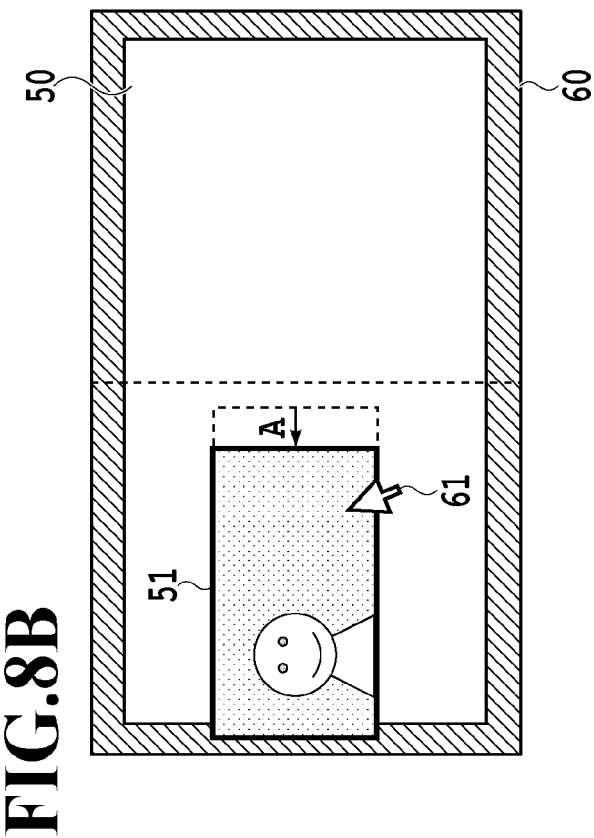

READABLE STORAGE MEDIUM, INFORMATION PROCESSING APPARATUS, AND METHOD OF CONTROLLING INFORMATION PROCESSING APPARATUS

CROSS-REFERENCE TO RELATED APPLICATIONS

This application claims the benefit of Japanese Patent Application No. 2021-069206, filed Apr. 15, 2021, which is hereby incorporated by reference herein in its entirety.

BACKGROUND OF THE INVENTION

Field of the Invention

The present disclosure relates to a technique for editing an album.

Description of the Related Art

Some layout software for creating designs by placing objects such as images and text has a function of displaying and presenting a trimming region to the user. A trimming region refers to, for example, a region to be trimmed in printing for the purpose of aligning edges, a region of a cover to be used by being folded back in bookbinding, or the like. Such a trimming region is used as an indicator in a case of performing marginless printing. By placing an object with its edge overlapping the trimming region, an edge portion of the object will be trimmed in a post-printing process and a marginless product will be output.

Japanese Patent Application Laid-Open No. 2010-176275 discloses an object alignment function applicable to such layout software. Such a function is called object snapping. For example, in a case of performing marginless printing, this function may be utilized to place an object such that an edge of the object gets aligned with an outer edge of a trimming region. This can assist the marginless printing.

Incidentally, for the user of the layout software, it may be difficult to figure out the intention of the trimming region displaced, and/or the trimming region may bother the user during editing work. One solution known to this is to hide the trimming region by using layout software's display switching function.

SUMMARY OF THE INVENTION

However, with the trimming region hidden, there is no indicator of marginless printing, which may cause an image loss in the output printed product that is not intended by the user. One may consider using the above-mentioned object snapping to place an object such that an edge of the object gets aligned with the corresponding outer edge of the trimming region. However, with the trimming region hidden, the user may be unable to figure out a reference position for the layout.

In view of the above problems, an object of the present disclosure is to improve convenience for a user to lay out image data.

One embodiment of the present invention is a non-transitory computer readable storage medium storing a program that causes a computer to function as a display control unit capable of displaying a screen having a first region in which to place an object and a second region surrounding the first region, and configured to switch to displaying or to hiding the second region in the screen according to a setting indicating whether to display or to hide the second region, wherein, even in a case when the setting indicates hiding the second region, the display control unit displays the second region based on a position of the object in the first region.

Further features of the present invention will become apparent from the following description of exemplary embodiments with reference to the attached drawings.

BRIEF DESCRIPTION OF THE DRAWINGS

FIGS. 8A to 8D are diagrams illustrating an editing screen in the first embodiment;

DESCRIPTION OF THE EMBODIMENTS

First Embodiment

<Information Processing Apparatus>

Figure 1:
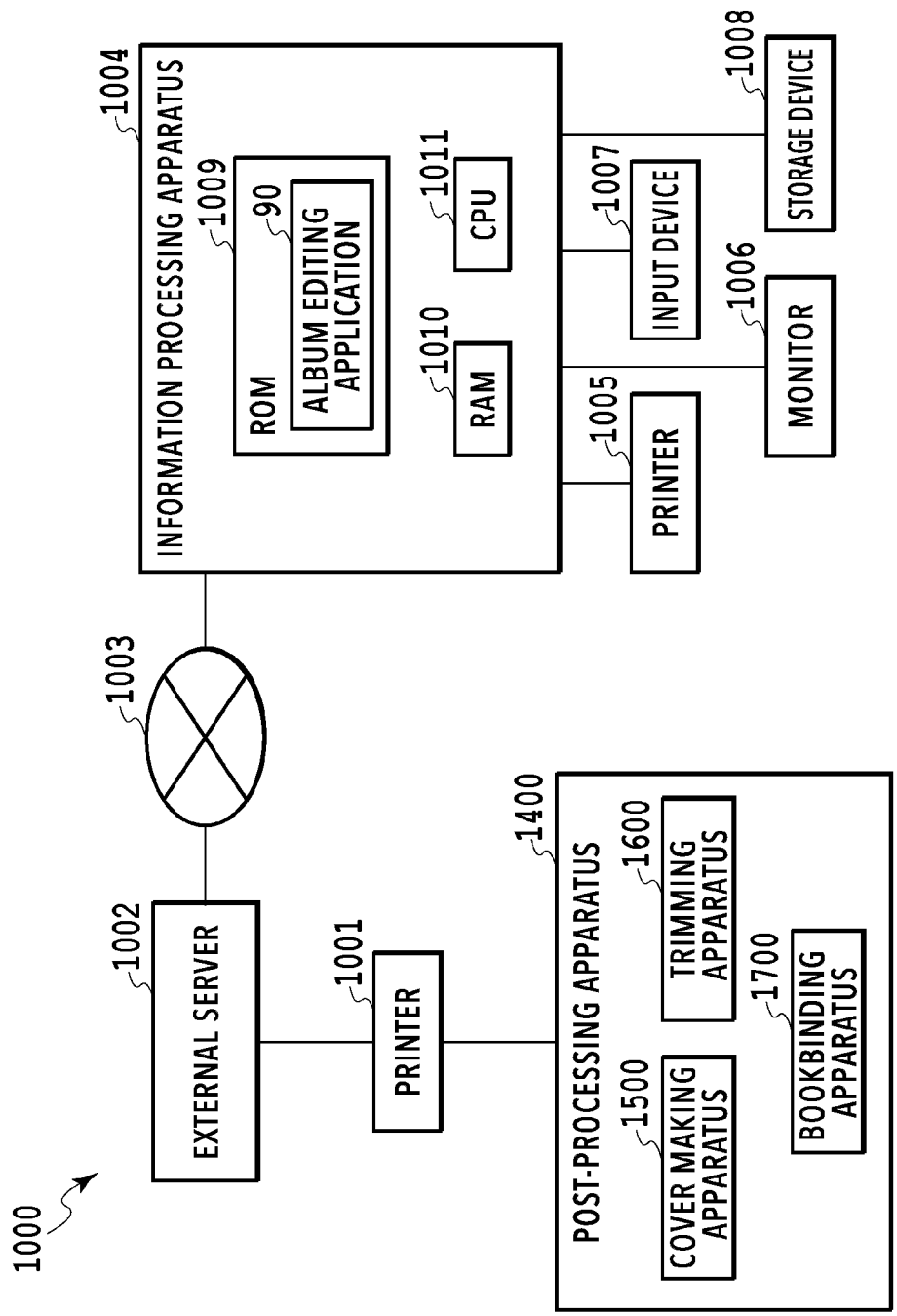
FIG. 1 is a diagram illustrating a configuration of a printing system.
Figure 2:
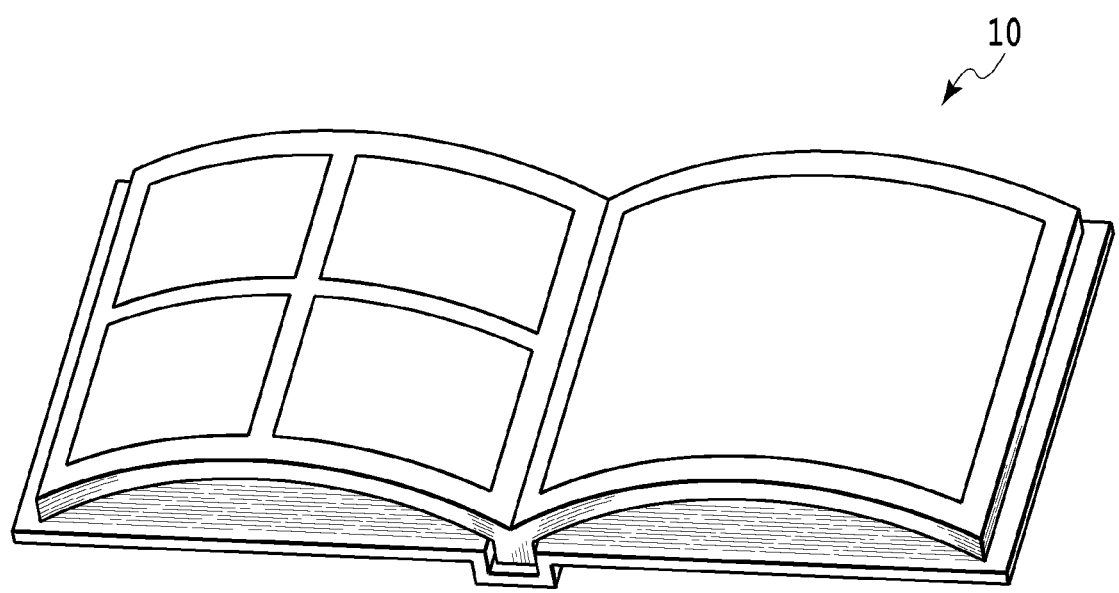
FIG. 2 is a diagram illustrating a created album.

FIG. 1A is a block diagram illustrating an example of the hardware configuration of a printing system 1000 according to the present embodiment. A configuration of an information processing apparatus 1004 will be described first. A ROM 1009 in the information processing apparatus 1004 stores the program of an album editing application 90. The album editing application 90 is capable of creating album data for creating an album 10 (called a photo album, a photo book, or the like) as illustrated in FIG. 2 based on image data input thereto. Note that the present embodiment will be described with the album 10 as a product to be printed, but the product to be printed is not limited to an album. The present embodiment is applicable to pieces of layout software in general that output products to be printed as well as the album 10.

The information processing apparatus 1004 is capable of outputting album data as print data to a printer 1005 and uploading the album data to an external server 1002. The information processing apparatus 1004 has the ROM 1009, a RAM 1010, and a CPU 1011. Also, the printer 1005, a monitor 1006, an input device 1007, and a storage device 1008 are connected to the information processing apparatus 1004. The information processing apparatus 1004 also has an input-output interface (not illustrated) for connecting to a network 1003. Note that the album data contains a plurality of pieces of double-page spread data. Moreover, one or more pieces of image data are placed in each of the pieces of double-page spread data on a plurality of double-page spreads.

The CPU 1011 is a central processing unit and performs control of the entire information processing apparatus 1004 (display control, etc.) by executing an operating system program (here after abbreviated as "OS") stored in the storage device 1008, the ROM 1009, or the RAM 1010. The CPU 1011 also executes functions of the information processing apparatus 1004 by executing programs stored in the ROM 1009 or the RAM 1010. The ROM 1009 stores programs therein. The RAM 1010 is a random access memory and is used as a work memory for the CPU 1011. The RAM 1010 stores the programs therein in a case where the RAM 1010 is a non-volatile RAM.

The information processing apparatus 1004 is capable of communicating with the external server 1002 via the network 1003. The external server 1002 has an input-output interface (not illustrated) for connecting to a printer 1001, and is capable of communicating with the printer 1001 via the input-output interface.

Album data created by the information processing apparatus 1004 is uploaded to the external server 1002 via the network 1003. The external server 1002 sends print data based on the uploaded album data to the printer 1001. The external server 1002, for example, receives album creation orders, manages album creation orders, and creates print data based on album data and instructs the printer 1001 to perform printing. The user uploads the album data created by the information processing apparatus 1004 to the external server 1002 and performs a necessary album purchase procedure. In a case when these user operations are properly performed, the external server 1002 sends print data based on the album data to the printer 1001. Thereafter, the printed product printed by the printer 1001 is bound into a book by a post-processing apparatus 1400. In the bookbinding process, the printed product is separated into a cover page and non-cover pages. The cover page is created by a cover making apparatus 1500 by folding edge portions of a thick paper sheet. The non-cover pages are trimmed by a trimming apparatus 1600 for the purpose of aligning their edges. Thereafter, the cover page and the non-cover pages are bound into a book by a bookbinding apparatus 1700 and delivered to the user as the album 10 as illustrated in FIG. 2.

The printer 1005 executes printing based on the print data containing the album data created by the information processing apparatus 1004. The user may bind the printed product printed by the printer 1005 into a book. The monitor 1006 is a display device that displays image information output from the information processing apparatus 1004. The input device 1007 is an input device such as a keyboard and/or a pointing device for entering inputs to the information processing apparatus 1004. The input device may be in the form of a touch panel, which integrally includes a monitor that can be directed touched to enter inputs. The storage device 1008 is a storage device such as an HDD or an SSD for storing image data, templates, and so on. Note that the configuration illustrated in FIG. 1 is exemplary, and another configuration may be employed. For example, the configuration may be such that the information processing apparatus 1004 includes the monitor 1006, the input device 1007, and the storage device 1008.

<Album Editing Application>

Next, processing by the album editing application in the present embodiment will be described using FIGS. 3 to 6B.

Figure 3:
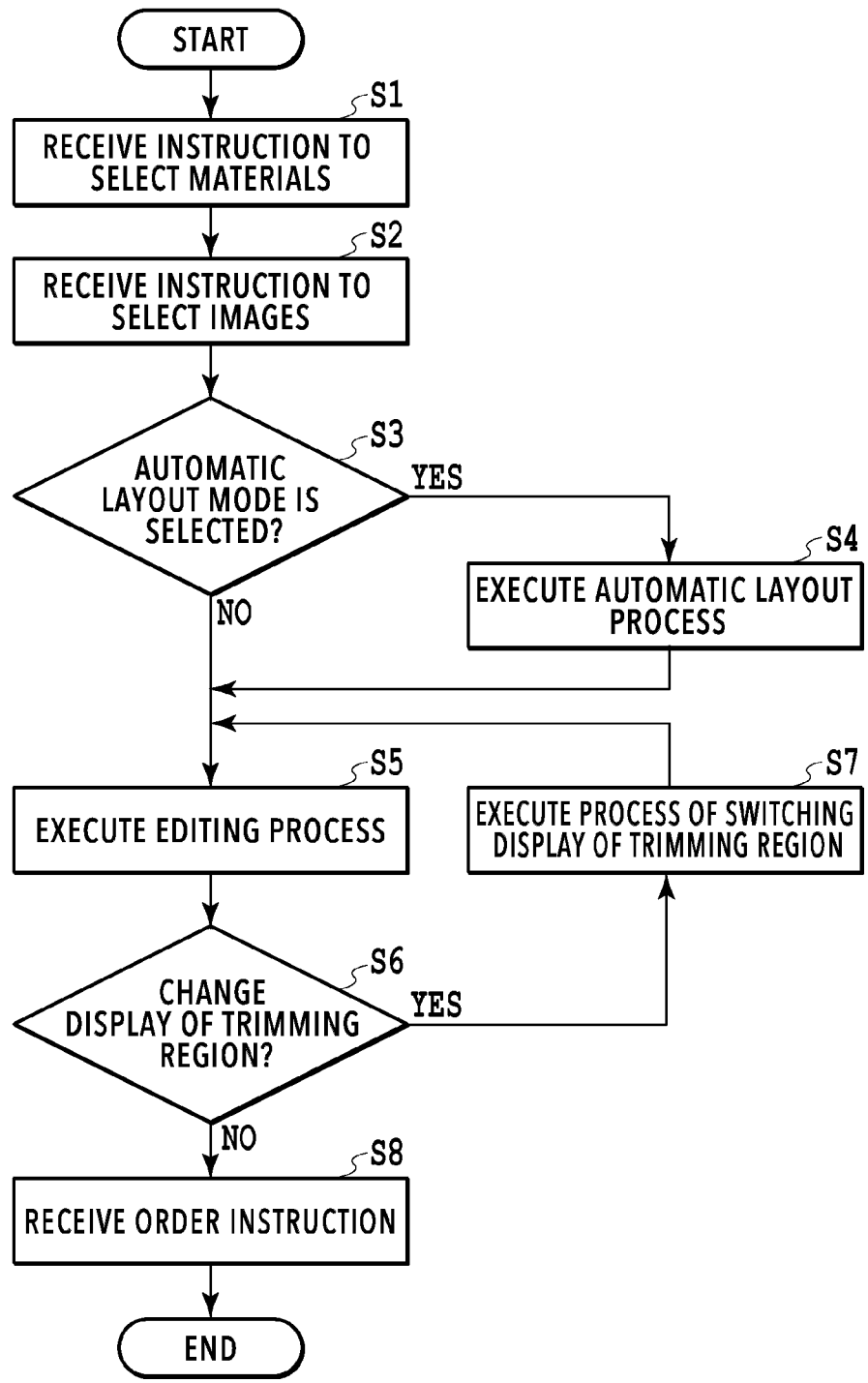
FIG. 3 is a flowchart illustrating processing by an album editing application.

In response to the user launching the album editing application 90, the processing in FIG. 3 is started. Note that the CPU 1011 executes each step in FIG. 3 by reading a program associated with the processing in the flowchart out of a memory and executing it.

First, in step S1, the CPU 1011 receives an instruction to select materials from the user and sets the album size, the cover type, bookbinding format, the number of pages in the entire album, the sheet type, and the like according to the user's operation. In the following, "step S_" will be abbreviated as "S_".

In S2, the CPU 1011 receives an instruction to select images from the user. In response to the user selecting a desired folder, a screen with a list of pieces of image data stored in the selected folder is displayed. In a case when the user selects pieces of image data via this screen, the CPU 1011 executes the process of S2.

In S3, the CPU 1011 determines whether an automatic layout mode has been selected as a layout mode, according to the user's operation. In a case when the result of the determination in this step is positive, the flow proceeds to S4. In a case when the result of the determination in this step is negative, the flow proceeds to S5.

In a case when the result of the determination in S3 is positive (i.e., the automatic layout mode is selected), the CPU 1011 executes an automatic layout process in S4. Specifically, the CPU 1011 firstly disables object snapping, which is an object alignment function. Thereafter, the CPU 1011 evaluates each piece of image data selected in the image selection (S2) and scores the piece of image data. Then, based on the score given to each piece of image data, pieces of image data to be placed in album data are selected. The CPU 1011 lays out a selected piece(s) of image data in a double-page spread region 50 (see FIG. 4). By the automatic layout process, a process of determining double-page spreads in which to place the pieces of image data and a process of determining the size of each piece of image data to be placed are automatically performed. Also, in the case when the automatic layout mode is selected in S3, each piece of image data selected in the image selection (S2) is always laid out in one of the double-page spreads.

In a case when the result of the determination in S3 is negative (i.e., a manual layout mode is selected), the CPU 1011 enables the object snapping, which is an object alignment function. Note that, in the case when the manual layout mode is selected, the user selects pieces of image data to be placed in album data, determines double-page spreads in which to place the pieces of image data, and determines the size of each piece of image data. Also, in the case when the manual layout mode is selected, only the images selected by the user among the pieces of image data selected in the image selection (S2) are laid out in the double-page spreads.

Figure 4:
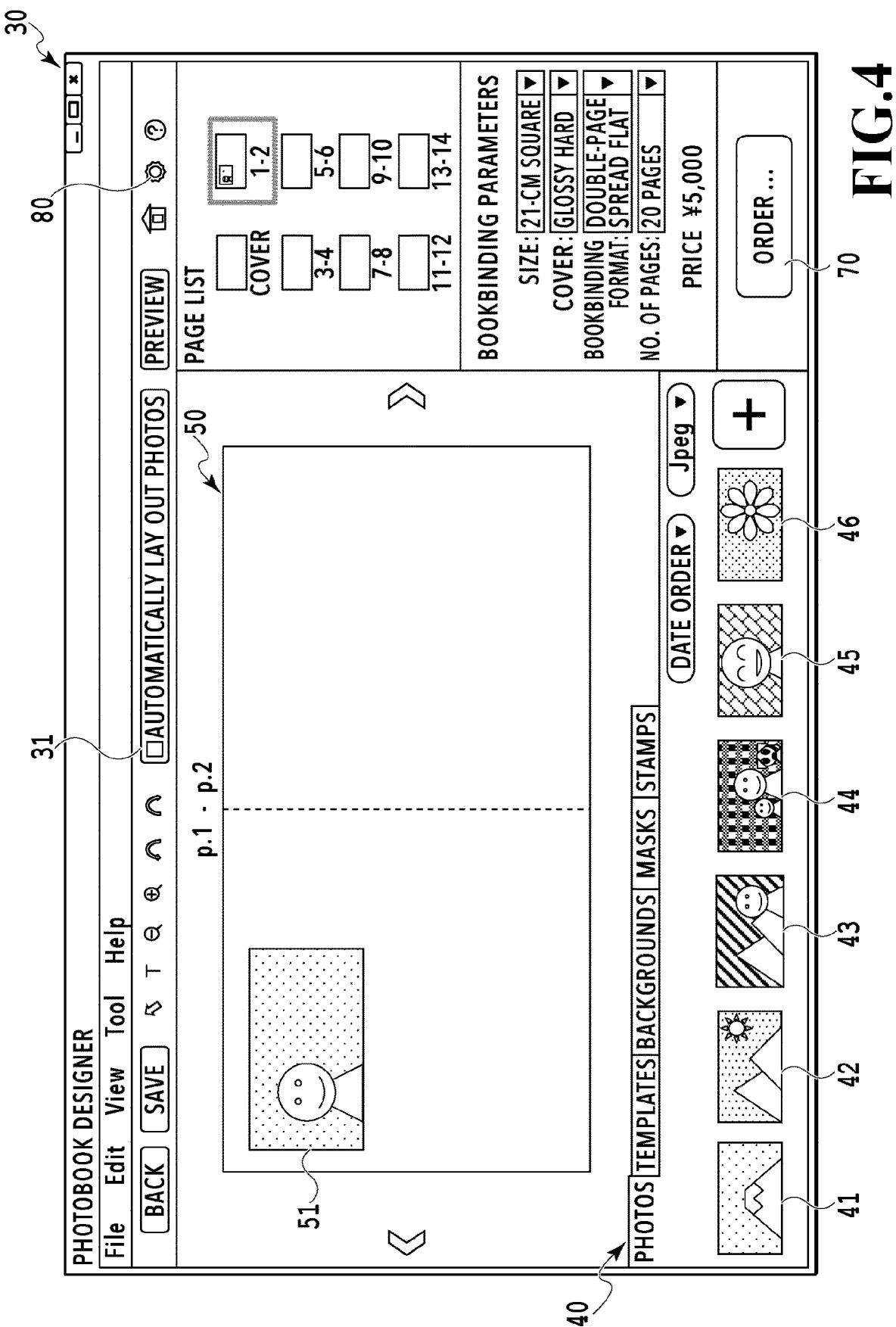
FIG. 4 is a diagram illustrating an editing screen.

After the process of determining whether the layout mode is the automatic layout mode (S3) or the automatic layout process (S4), the CPU 1011 executes an editing process corresponding to the user's operation in S5. In the case of executing the editing process after the automatic layout process (S4), the CPU 1011 displays an editing screen 30 including double-page spreads in which pieces of image data have been laid out. On the other hand, in the case of executing the editing process without the automatic layout process (S4), the editing screen in FIG. 4 is displayed. Note that, in a case when the editing process is executed without the automatic layout process (S4) and the editing screen 30 is displayed for the first time, there is no piece of image data placed in the double-page spread region 50. Incidentally, the editing screen 30 is provided by the album editing application 90.

The editing screen 30 has a checkbox 31 for switching the layout mode, an order button 70, and an environment setting button 80. The editing screen 30 also has an image selection region 40. The checkbox 31 accepts selection of whether to perform automatic layout or manual layout.

In the graphical user interface illustrated in FIG. 4, pieces of image data 41 to 46 are displayed in the image selection region 40 as the group of pieces of image data selected in S2 described above. The editing screen 30 also has the album's double-page spread region 50. Note that FIG. 4 illustrates the result of the user placing image data 51 in the double-page spread region 50 of the editing screen 30 in an initial state.

The album editing application 90 also has an environment setting function that allows the user to switch the editing work display according to the user's preference. The environment setting button 80 is used for the user to switch the editing work display according to the user's preference. In response to pressing the environment setting button 80, the CPU 1011 displays an environment setting screen 81 illustrated in FIG. 5 in place of the editing screen 30 (or together with the editing screen 30). Each checkbox in the environment setting screen 81 is to accept the user's selection.

In S6, the CPU 1011 determines whether to switch the display of a trimming region. In a case when the result of the determination in this step is positive, the flow proceeds to S7. In a case when the result of the determination in this step is negative, the flow proceeds to S8. Note that, in the present embodiment, the result of the determination in this step is positive in a case when the presence or absence of a check in a checkbox 82 in FIG. 5 about whether to "DISPLAY THE TRIMMING REGION" is changed.

Figure 6A:
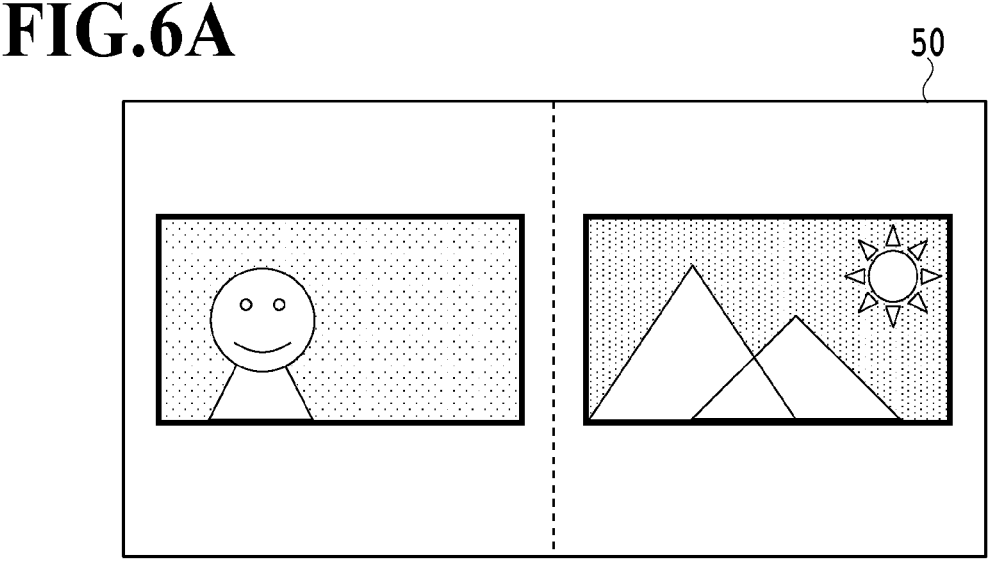
FIGS. 6A and 6B are diagrams illustrating a state of hiding a trimming region and a state of displaying it, respectively.
Figure 6B:
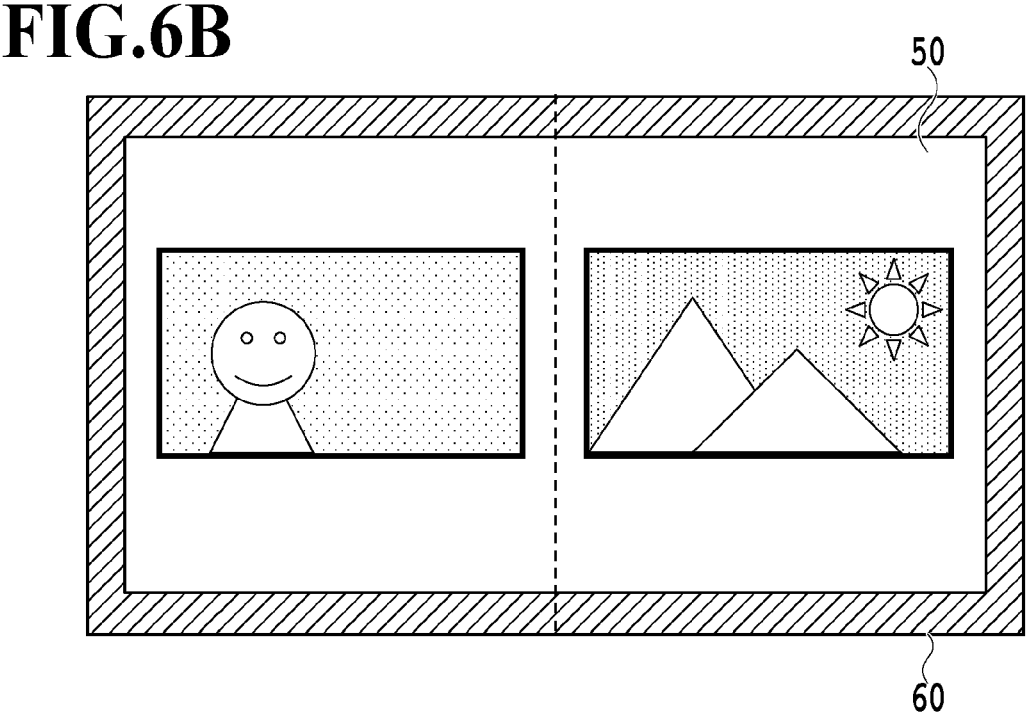

Now, the switching of the display of the trimming region in printing will be described. In a case when the checkbox 82 is not selected, the CPU 1011 hides the trimming region by displaying only the rectangular double-page spread region 50, as illustrated in FIG. 6A. On the other hand, in the case when the user selects the checkbox 82, the CPU 1011 performs a process of switching the display of the trimming region in S7. By this switching process, a trimming region 60 is displayed, as illustrated in FIG. 6B.

Note that "trimming region" is a collective term for a region of printed pages to be trimmed in bookbinding for the purpose of aligning their edges, and a region of a cover to be used by being folded back in bookbinding. The album editing application 90 uses the trimming region 60 as an indicator in a case of performing marginless printing. Also, in response to the user pressing a close button 83 after determining the settings via the environment setting screen 81, the CPU 1011 receives the user input and transitions to the editing screen 30. Note that the items that can be switched via the environment setting screen 81 are not limited to the five items listed in FIG. 5 and can be changed according to the type of the application.

After the album editing, the user presses the order button 70. In S8, the CPU 1011 receives the user's order instruction. This completes the series of processes. The above is a general description of the processing by the album creation application.

<Realtime Switching of Display of Trimming Region>

Figure 7:
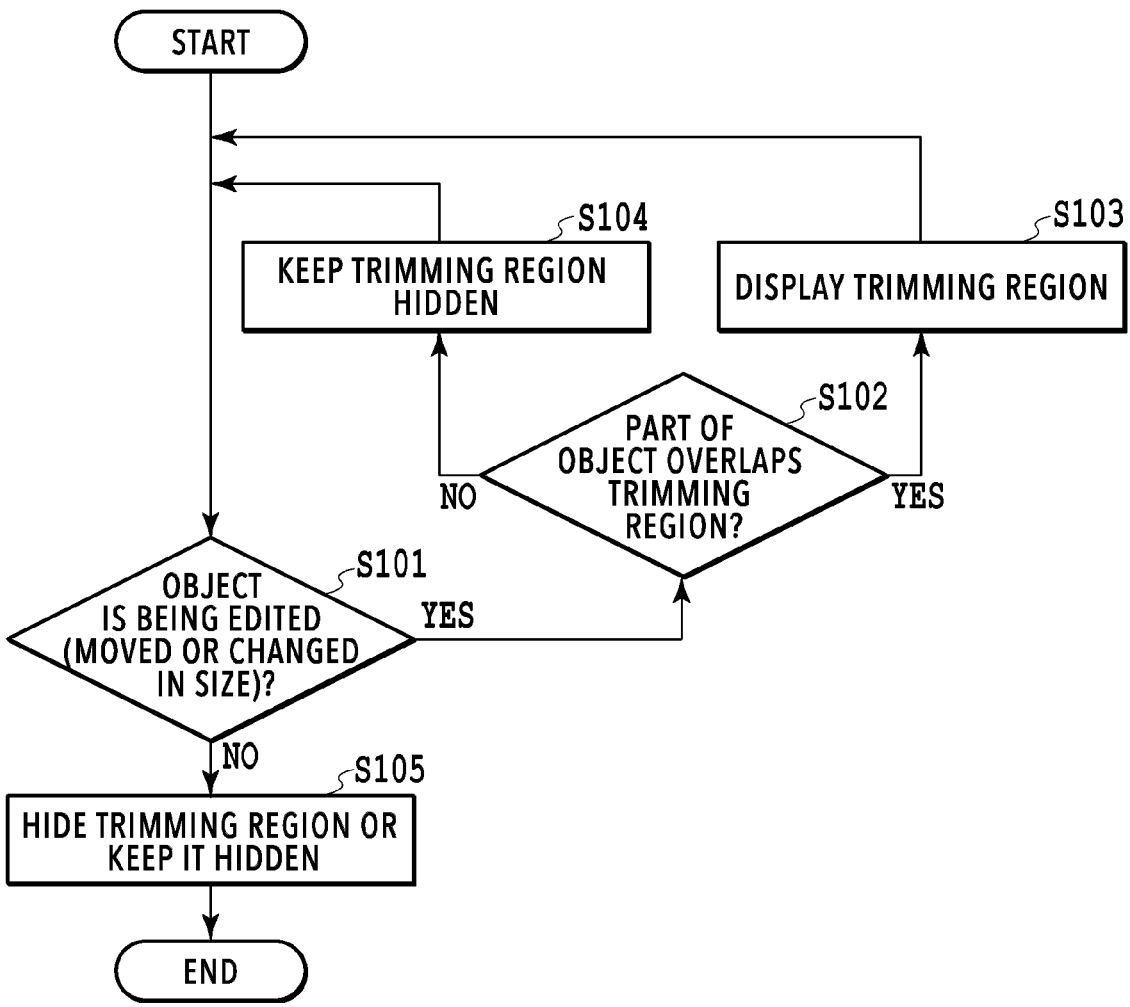
FIG. 7 is a flowchart illustrating processing in a first embodiment.
Figure 9:
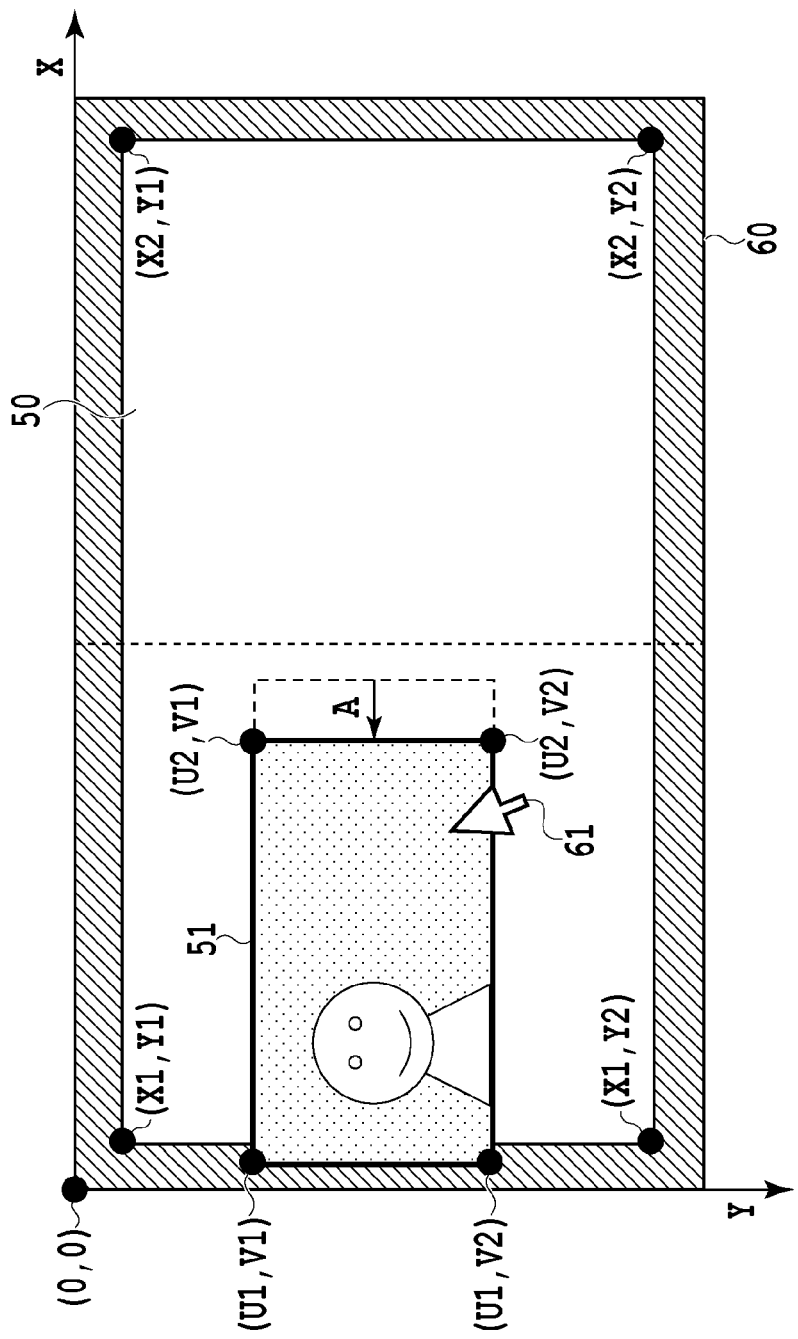
FIG. 9 is a diagram explaining overlap determination in the first embodiment.

Next, the switching of the display of the trimming region, which is the characteristic feature of the present embodiment, will be described using FIGS. 7 to 9. In the present embodiment, the display of the trimming region 60 is switched based on the position of the image data 51 in the double-page spread region 50 in a state where the trimming region 60 is hidden as a result of not selecting the above-mentioned checkbox 82. FIG. 7 is a flowchart illustrating processing in the present embodiment, and FIGS. 8A to 8D illustrate an editing screen in the present embodiment.

Figure 5:
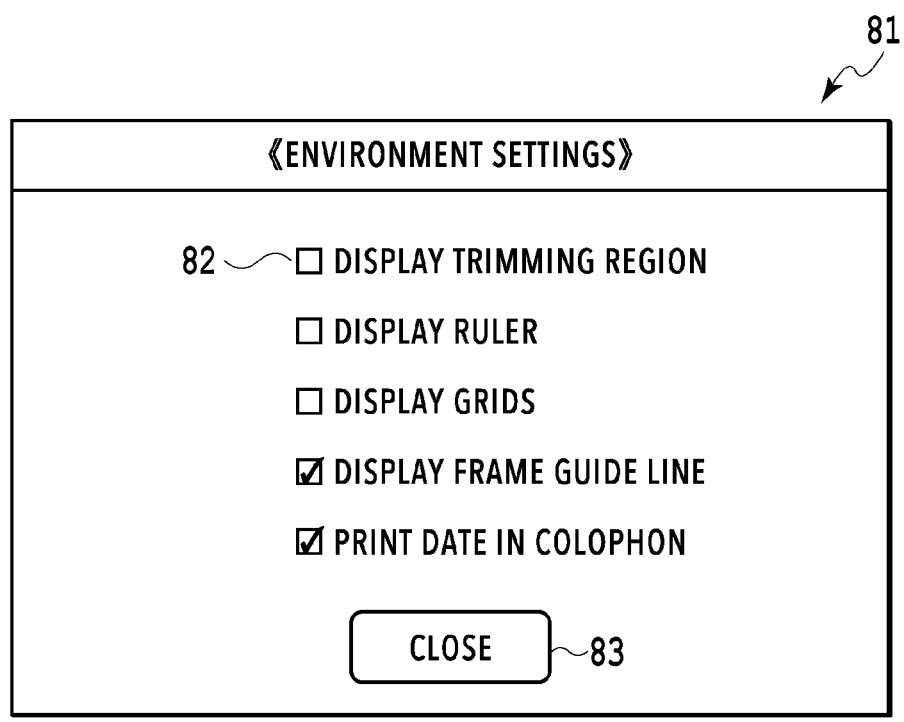
FIG. 5 is a diagram illustrating an environment setting screen.

In the case when the checkbox 82 in the environment setting screen 81 in FIG. 5 is not selected, the double-page spread region 50 is in a state where the trimming region 60 is hidden, as illustrated in FIG. 8A. Thus, the trimming region 60 is not unnecessarily displayed, so that the user's editing work will not be interrupted by the trimming region 60. The following description will be given by taking as an example a case when, to change the position of the image data 51 with the trimming region 60 hidden as above, the user selects the image data 51 and moves the selected image data 51 to re-place it.

In S101, the CPU 1011 determines whether the object in the double-page spread region 50 is being edited, e.g., whether the object is being moved, turned, or changed in size. In a case when the result of the determination in this step is positive, the flow proceeds to S102. In a case when the result of the determination in this step is negative, the flow proceeds to S105.

For example, in a case when the user selects the image data 51 in the editing screen 30, the CPU 1011 receives an instruction indicating that the user has selected the image data 51 as the editing target. The CPU 1011 then determines that the object in the double-page spread region 50 is being edited (YES in S101).

In S102, the CPU 1011 determines whether a part of the object being edited has overlapped the trimming region 60. In a case when the result of the determination in this step is positive, the flow proceeds to S103. In a case when the result of the determination in this step is negative, the flow proceeds to S104.

For example, in a case when the user is moving the image data 51 in the editing screen 30, the CPU 1011 determines in S102 whether the image data 51 and the trimming region 60 overlap each other. Note that the overlap determination in S102 will be described later by using FIG. 9. Now, consider a case when, as illustrated in FIG. 8B, the user selects the image data 51 with a mouse cursor 61 and moves it in a direction A and, as a result, a part of the image data 51 overlaps the trimming region 60. In this case, the CPU 1011 determines that a part of the object being edited has overlapped the trimming region 60 (YES in S102).

In S103, the CPU 1011 displays the trimming region 60 while the image data 51 is moved.

In S104, the CPU 1011 keeps the trimming region 60 hidden.

In S105, the CPU 1011 hides the trimming region 60 or keeps it hidden.

In a case when the user moves the image data 51 in the trimming region 60, the CPU 1011 repeats the processes of S101, S102, and S103 to keep displaying the trimming region 60 while the image data 51 is moved. Thereafter, the user places the image data 51 at a new position and unselects the image data 51. In response to this, the CPU 1011 receives the user instruction to unselect the image data 51 and hides the trimming region 60, as illustrated in FIG. 8C (NO in S101→S105). Incidentally, in a case where an ordering process is performed in the state illustrated in FIG. 8C and a trimming process or a folding process is performed by the post-processing apparatus 1400, an output as illustrated in FIG. 8D is obtained. Also, in a case when the part of the image data 51 stops overlapping the trimming region 60 while the user moves the image data 51, the CPU 1011 detects this and hides the trimming region 60 (NO in S102→S104). Specifically, in a case when the user unselects the image data 51 or the part of the selected image data 51 stops overlapping the trimming region 60, the CPU 1011 detects this and hides the trimming region 60. The above is a flow of the series of processes in the present embodiment.

Now, the overlap determination between the image data 51 and the trimming region 60 (S102) will be described in detail using FIG. 9. The overlap detection between the image data 51 and the trimming region 60 is performed based on positional information (coordinates) on the image data 51 and positional information (coordinates) on the inner edges of the trimming region 60 within the page. As illustrated in FIG. 9, the coordinates of the upper left corner of the page (an outer edge of the trimming region 60) are (0,0), and the horizontal direction is an X direction while the vertical direction is a Y direction. The positional information (coordinates) on the inner edges of the trimming region 60 is such that the upper left corner is (X1,Y1), the lower left corner is (X1,Y2), the upper right corner is (X2,Y1), and the lower right corner is (X2,Y2). Note that these pieces of positional information (coordinates) may be different values for each page. For example, (X1,Y1) may be (15,15) for the cover page while (X1,Y1) may be (5,5) for the non-cover pages. In this way, it is possible to leave a fold region necessary for the bookbinding of the cover page, while also minimizing the trimming region of each non-cover page. Also, the pieces of positional information (coordinates) on the edges of the image data 51 being moved are such that the upper left corner is (U1,V1), the lower left corner is (U1,V2), the upper right corner is (U2,V1), and the lower right corner is (U2,V2), and are updated as the image data 51 is moved.

The overlap determination (S102) is performed by determining, based on these pieces of positional information (coordinates), whether any of the edges of the image data 51 is located outside the corresponding inner edge of the trimming region 60. In the example of FIG. 9, in a case when U1<X1 on the left side of the page, the CPU 1011 determines that the left edge of the image data 51 is located on an outer left side relative to the inner edge of the trimming region 60. As a result, the result of the determination in S102 is positive, so that the flow proceeds to S103. Note that the above example is about the left edge of the image data 51, and similar processes are performed on the other edge as well.

Advantageous Effect of the Present Embodiment

As described above, in the present embodiment, the display of the trimming region is switched based on the position and editing state of the image data in the double-page spread region. In this way, the trimming region is displayed only when it needs to be. Hence, it is possible to improve convenience for the user during editing work.

Second Embodiment

Next, a second embodiment will be described. The present embodiment differs from the first embodiment in the trimming region to be displayed. Specifically, in the first embodiment, a trimming region corresponding to all four sides of a double-page spread is displayed. On the other hand, in the present embodiment, a trimming region corresponding to at least one side overlapping image data is displayed. Note that, in the following description, a description of constituent components similar to those in the foregoing embodiment is omitted as appropriate by, for example, denoting them with the same reference signs or using the same names.

<Realtime Switching of Display of Trimming Region>

Figure 10:
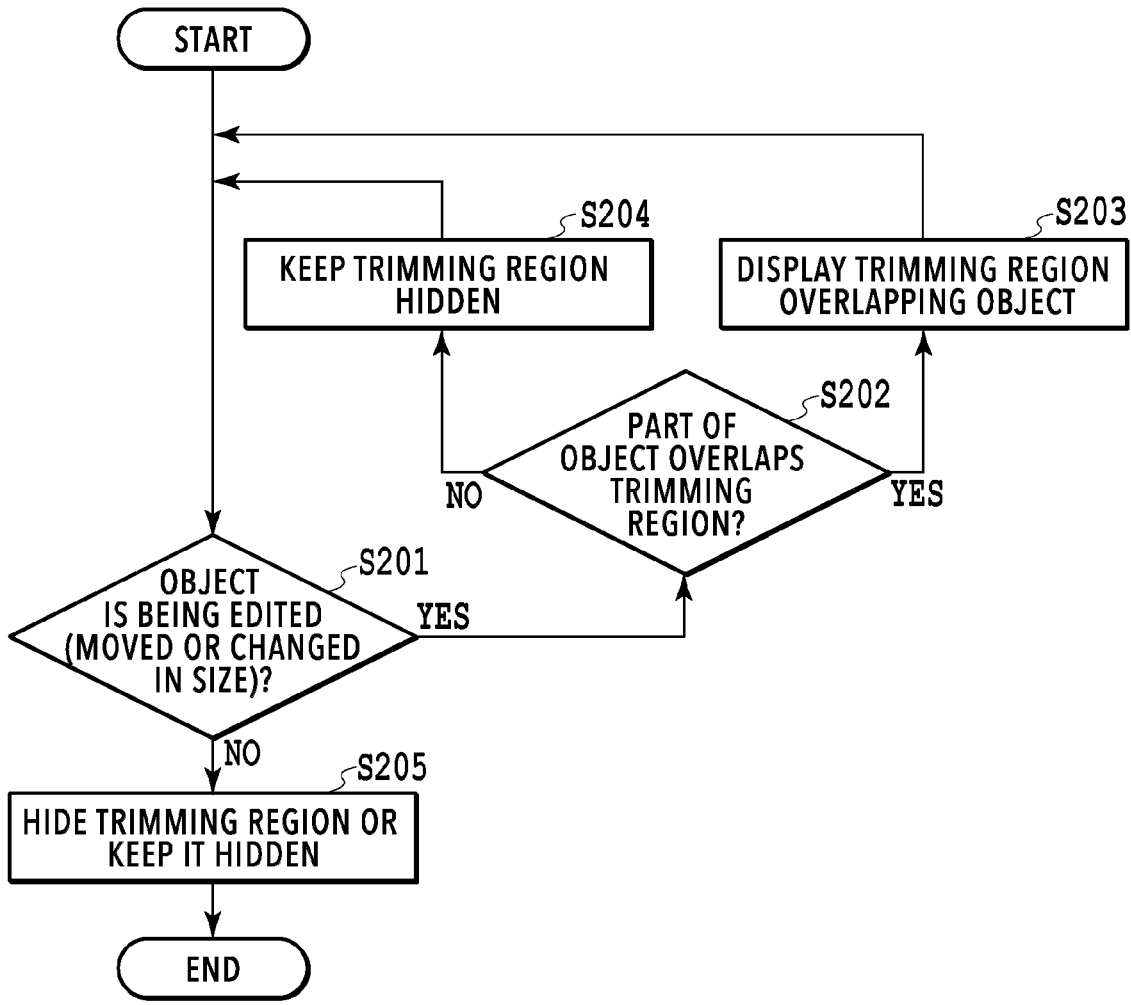
FIG. 10 is a flowchart illustrating a process in a second embodiment.

The switching of the display of the trimming region in the present embodiment will be described below using FIGS. 10 and 11A to 11D. FIG. 10 is a flowchart illustrating processing in the present embodiment, and FIGS. 11A to 11D illustrate an editing screen in the present embodiment. Note that the CPU 1011 executes each step in FIG. 10 by reading a program associated with the processing in the flowchart out of a memory and executing it. Incidentally, the series of processes by the album editing application 90 are the same as the processes in FIG. 3, and detailed description thereof is, therefore, omitted.

Figure 11A:
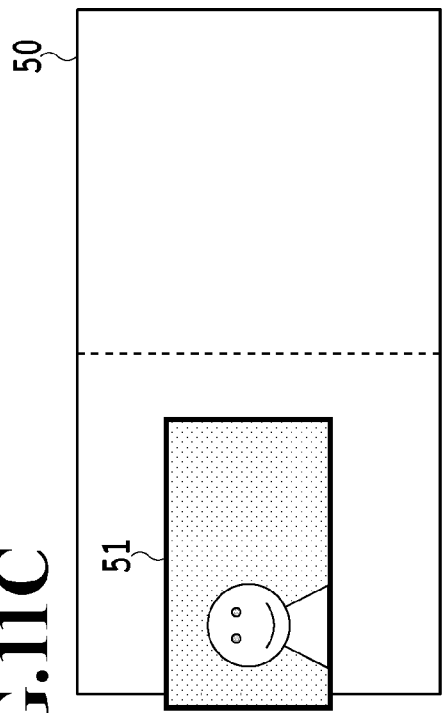
FIGS. 11A to 11D are diagrams illustrating an editing screen in the second embodiment.

In the case when the checkbox 82 in the environment setting screen 81 in FIG. 5 is not selected, the double-page spread region 50 is in a state where a trimming region 60 is hidden, as illustrated in FIG. 11A. Thus, the trimming region 60 is not unnecessarily displayed, so that the user's editing work will not be interrupted by the trimming region 60. The following description will be given by taking as an example a case when, to change the position of the image data 51 with the trimming region 60 hidden as above, the user selects the image data 51 and moves the selected image data 51 to re-place it.

In S201, the CPU 1011 determines whether the object in the double-page spread region 50 is being edited, e.g., whether the object is being moved, turned, or changed in size. In a case when the result of the determination in this step is positive, the flow proceeds to S202. In a case when the result of the determination in this step is negative, the flow proceeds to S205.

For example, in a case when the user selects the image data 51 in the editing screen 30, the CPU 1011 receives an instruction indicating that the user has selected the image data 51 as the editing target. The CPU 1011 then determines that the object in the double-page spread region 50 is being edited (YES in S201).

In S202, the CPU 1011 determines whether a part of the object being edited has overlapped the trimming region 60. In a case when the result of the determination in this step is positive, the flow proceeds to S203. In a case when the result of the determination in this step is negative, the flow proceeds to S204.

Figure 11C:
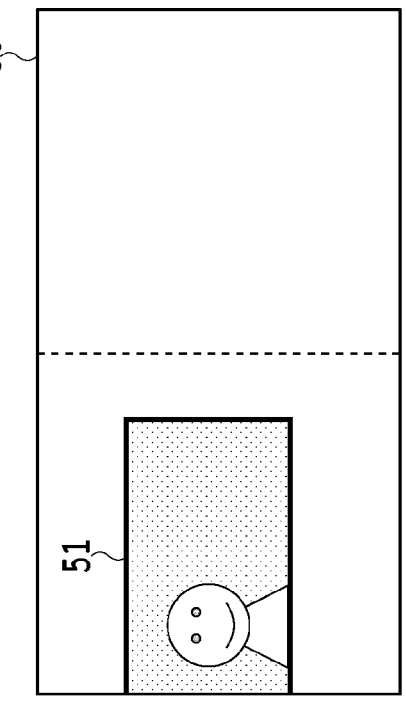
Figure 11B:
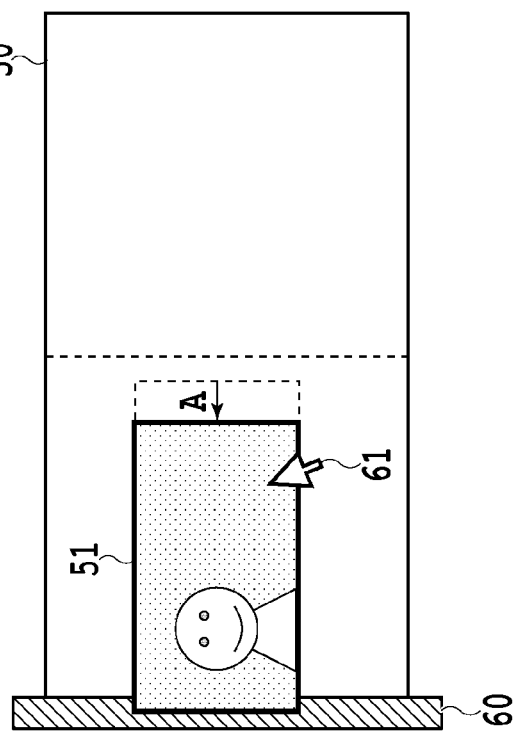

For example, in a case when the user is moving the image data 51 in the editing screen 30, the CPU 1011 determines in S202 whether the image data 51 and the trimming region 60 overlap each other. Note that the overlap determination in S202 is the same as that in the first embodiment, and a detailed description thereof is therefore omitted (see FIG. 9). Now, consider a case when, as illustrated in FIG. 11B, the user selects the image data 51 with the mouse cursor 61 and moves it in the direction A and, as a result, a part of the image data 51 overlaps the trimming region 60. In this case, the CPU 1011 determines that a part of the object being edited has overlapped the trimming region 60 (YES in S202).

In S203, while the image data 51 is moved, the CPU 1011 displays a trimming region 60 corresponding to the one or more sides among the four sides of the double-page spread region 50 overlapping the image data 51.

In S204, the CPU 1011 keeps the trimming region 60 hidden.

In S205, the CPU 1011 hides the trimming region 60 or keeps it hidden.

Figure 11D:
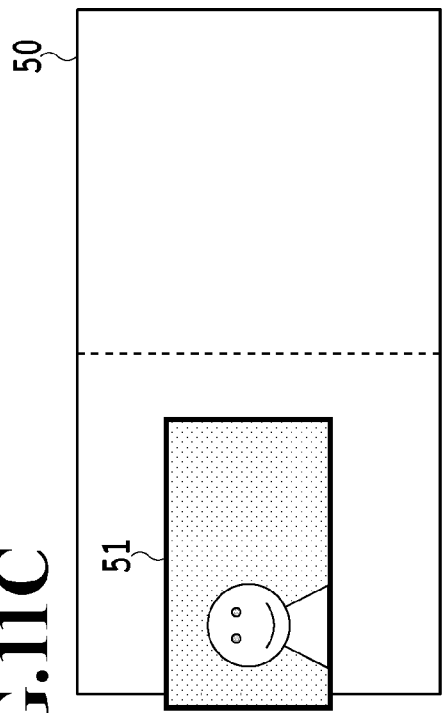

In a case when the user moves the image data 51 in the trimming region 60, the CPU 1011 repeats the processes of S201, S202, and S203 to keep displaying the trimming region 60 corresponding to the one or more sides among the four sides of the double-page spread region 50 overlapping the image data 51 while the image data 51 is moved. Thereafter, the user places the image data 51 at a new position and unselects the image data 51. In response to this, the CPU 1011 receives the user instruction to unselect the image data 51 and hides the trimming region 60, as illustrated in FIG. 11C (NO in S201→S205). Incidentally, in a case when an ordering process is performed in the state illustrated in FIG. 11C and a trimming process or a folding process is performed by the post-processing apparatus 1400, an output as illustrated in FIG. 11D is obtained. Also, in a case when the part of the image data 51 stops overlapping the trimming region 60 while the user moves the image data 51, the CPU 1011 detects this and hides the trimming region 60 (NO in S202→S204). Specifically, in a case when the user unselects the image data 51 or the part of the selected image data 51 stops overlapping the trimming region 60, the CPU 1011 detects this and hides the trimming region 60. The above is a flow of the series of processes in the present embodiment.

Advantageous Effect of the Present Embodiment

As described above, in the present embodiment, the display of the trimming region is switched based on the position and editing state of the image data in the double-page spread region to display or hide a part of the trimming region. In this way, only a necessary trimming region is displayed only when it needs to be. Hence, it is possible to improve convenience for the user during editing work.

Third Embodiment

Next, a third embodiment will be described. The present embodiment is the first embodiment with an object snapping function added thereto. Specifically, while the first embodiment only involves displaying a trimming region, the third embodiment involves displaying the trimming region in a case when image data overlaps with it, and also placing the image data such that an edge of the image data gets aligned with an outer edge of the trimming region displayed.

<Realtime Switching of Display of Trimming Region>

Figure 12:
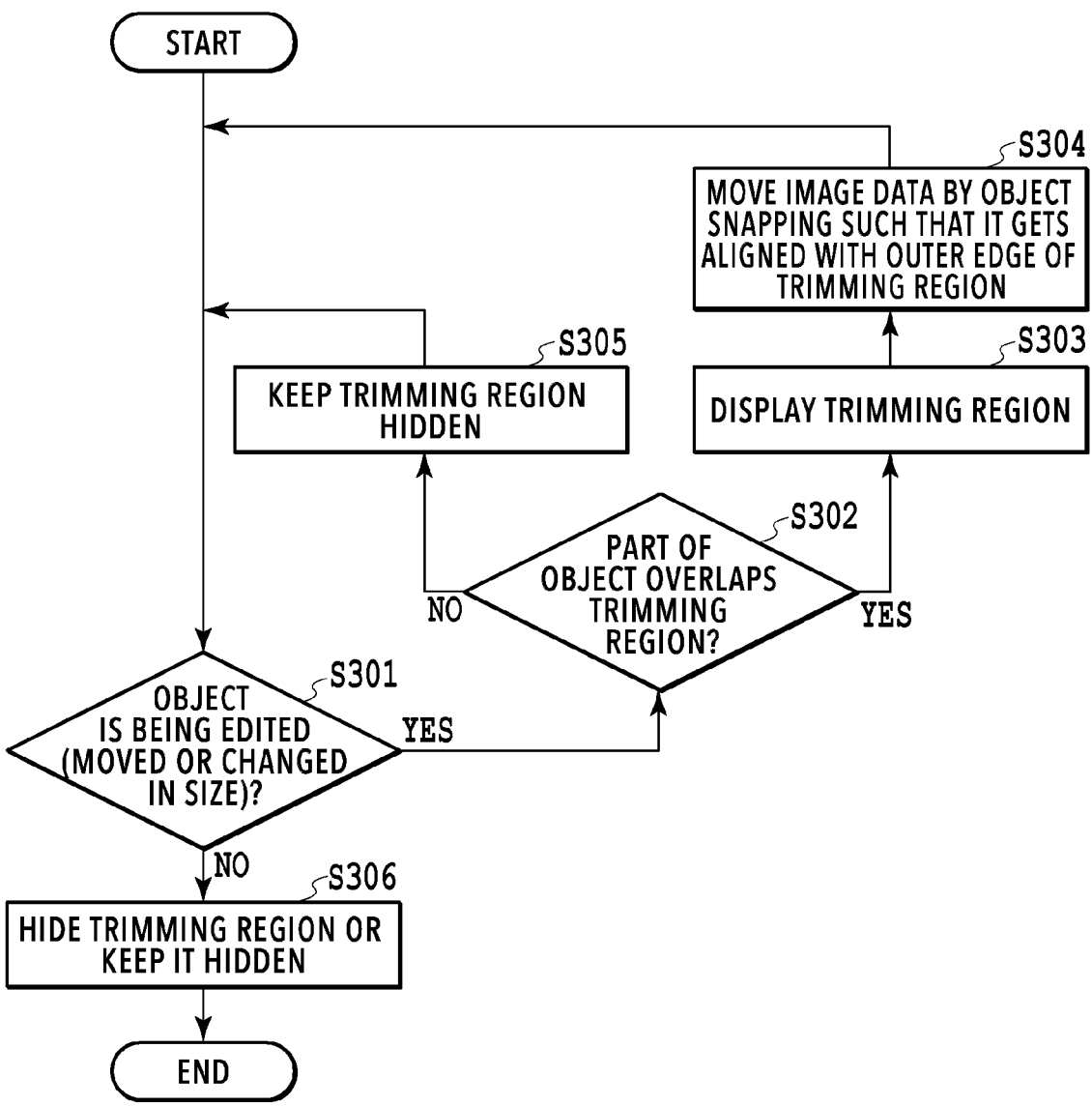
FIG. 12 is a flowchart illustrating a process in a third embodiment.

The switching of the display of the trimming region in the present embodiment will be described below using FIGS. 12 and 13A to 13E. FIG. 12 is a flowchart illustrating processing in the present embodiment, and FIGS. 13A to 13E illustrate an editing screen in the present embodiment. Note that the CPU 1011 executes each step in FIG. 12 by reading a program associated with the processing in the flowchart out of a memory and executing it. Incidentally, the series of processes by the album editing application 90 are the same as the processes in FIG. 3, and a detailed description thereof is, therefore, omitted.

Figure 13A:
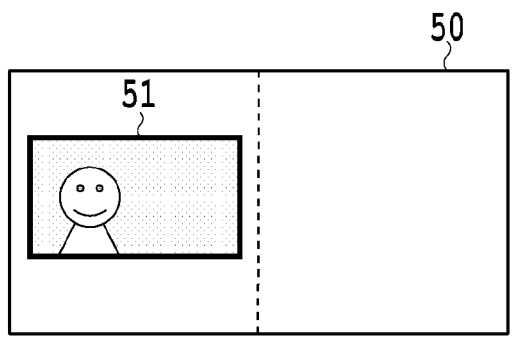
FIGS. 13A to 13E are diagrams illustrating an editing screen in the third embodiment.

In the case when the checkbox 82 in the environment setting screen 81 in FIG. 5 is not selected, the double-page spread region 50 is in a state where the trimming region 60 is hidden, as illustrated in FIG. 13A. Thus, the trimming region 60 is not unnecessarily displayed, so that the user's editing work will not be interrupted by the trimming region 60. The following description will be given by taking as an example a case when, to change the position of the image data 51 with the trimming region 60 hidden as above, the user selects the image data 51 and moves the selected image data 51 to re-place it.

In S301, the CPU 1011 determines whether the object in the double-page spread region 50 is being edited, e.g., whether the object is being moved, turned, or changed in size. In a case when the result of the determination in this step is positive, the flow proceeds to S302. In a case when the result of the determination in this step is negative, the flow proceeds to S306.

For example, in a case when the user selects the image data 51 in the editing screen 30, the CPU 1011 receives an instruction indicating that the user has selected the image data 51 as the editing target. The CPU 1011 then determines that the object in the double-page spread region 50 is being edited (YES in S301).

In S302, the CPU 1011 determines whether a part of the object being edited has overlapped the trimming region 60. In a case when the result of the determination in this step is positive, the flow proceeds to S303. In a case when the result of the determination in this step is negative, the flow proceeds to S305.

Figure 13B:
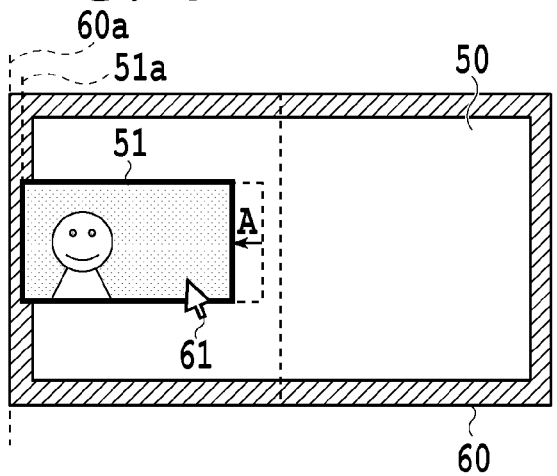

For example, in a case when the user is moving the image data 51 in the editing screen 30, the CPU 1011 determines in S302 whether the image data 51 and the trimming region 60 overlap each other. Note that the overlap determination in S302 is the same as that in the first embodiment, and a detailed description thereof is therefore omitted (see FIG. 9). Now, consider a case when, as illustrated in FIG. 13B, the user selects the image data 51 with the mouse cursor 61 and moves it in the direction A and, as a result, a part of the image data 51 overlaps the trimming region 60. In this case, the CPU 1011 determines that a part of the object being edited has overlapped the trimming region 60 (YES in S302).

In S303, the CPU 1011 displays the trimming region 60 while the image data 51 is moved.

Figure 13C:
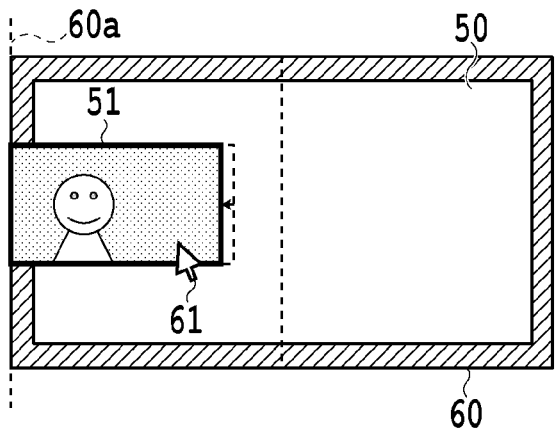

In S304, the CPU 1011 moves the image data 51 by object snapping such that an edge 51a of the image data 51 gets aligned with an edge 60a of the trimming region 60. Note that details of the object snapping will be described later. As a result of this step, the editing screen becomes as illustrated in FIG. 13C.

In S305, the CPU 1011 keeps the trimming region 60 hidden.

In S306, the CPU 1011 hides the trimming region 60 or keeps it hidden.

Figure 13D:
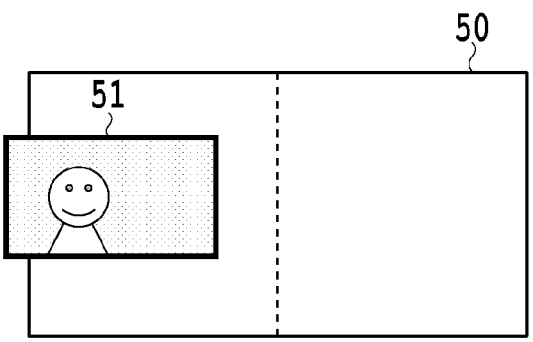
Figure 13E:
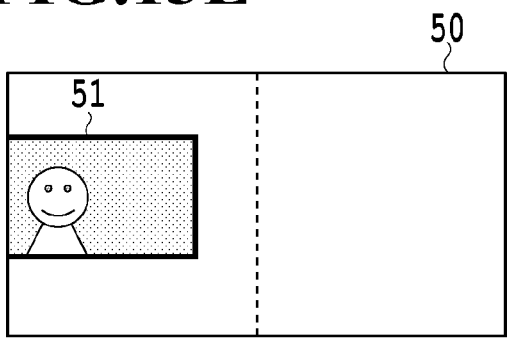

In a case when the user moves the image data 51 in the trimming region 60, the CPU 1011 repeats the processes of S301, S302, S303, and S304 to keep displaying the trimming region 60 while the image data 51 is moved. Also, at the same time, the CPU 1011 moves the image data 51 such that the edge 51a of the image data 51 gets aligned with the edge 60a of the trimming region 60. Thereafter, the user unselects the image data 51. In response to this, the CPU 1011 receives the user instruction to unselect the image data 51 and hides the trimming region 60, as illustrated in FIG. 13D (NO in S301→S306). Incidentally, in a case when an ordering process is performed in the state illustrated in FIG. 13D and a trimming process or a folding process is performed by the post-processing apparatus 1400, an output as illustrated in FIG. 13E is obtained. Also, in a case when the part of the image data 51 stops overlapping the trimming region 60 while the user moves the image data 51, the CPU 1011 detects this and hides the trimming region 60 (NO in S302→S305). Specifically, in a case when the user unselects the image data 51 or the part of the selected image data 51 stops overlapping the trimming region 60, the CPU 1011 detects this and hides the trimming region 60. The above is a flow of the series of processes in the present embodiment.

<Object Snapping>

A layout process by object snapping will be described below. Object snapping refers to a function or a process of automatically determining a position to place a new object (e.g., an object that is being selected by the user as an editing target) based on the position of an object that has already been placed. In a case when the user places a new object, object snapping facilitates positioning such as alignment of an edge of an object that has already been placed with an edge of the new object.

Specifically, in a case when the new object gets into a predetermined range from the placed object, the CPU 1011 displays a reference line for object snapping in extension of the placed object, and the new object automatically gets placed along the reference line.

In the present embodiment, the layout process by object snapping is performed with the trimming region 60 as a placed object and the image data 51 as a new object. Note that the predetermined range in the present embodiment may be the entire trimming region 60 or a predetermined distance (e.g., 1 mm or less) from each outer edge of the trimming region 60. The album editing application 90 in the present embodiment is software capable of executing such object snapping.

Advantageous Effects of the Present Embodiment

As described above, in the present embodiment, the switching of the display of the trimming region and the layout of the image data are performed based on the position and editing state of the image data in the double-page spread region. In this way, the trimming region can be displayed only when it needs to be and, at the same time, the image data can be moved such that an edge of the image data gets aligned with an outer edge of the trimming region. This can improve convenience for the user during editing work and assist marginless printing.

Fourth Embodiment

Next, a fourth embodiment will be described. The present embodiment is the third embodiment additionally involving displaying a notification. Specifically, while the third embodiment involves displaying a trimming region and positioning of the displayed trimming region and image data, the fourth embodiment involves displaying a notification along with them.

<Realtime Switching of Display of Trimming Region>

Figure 14:
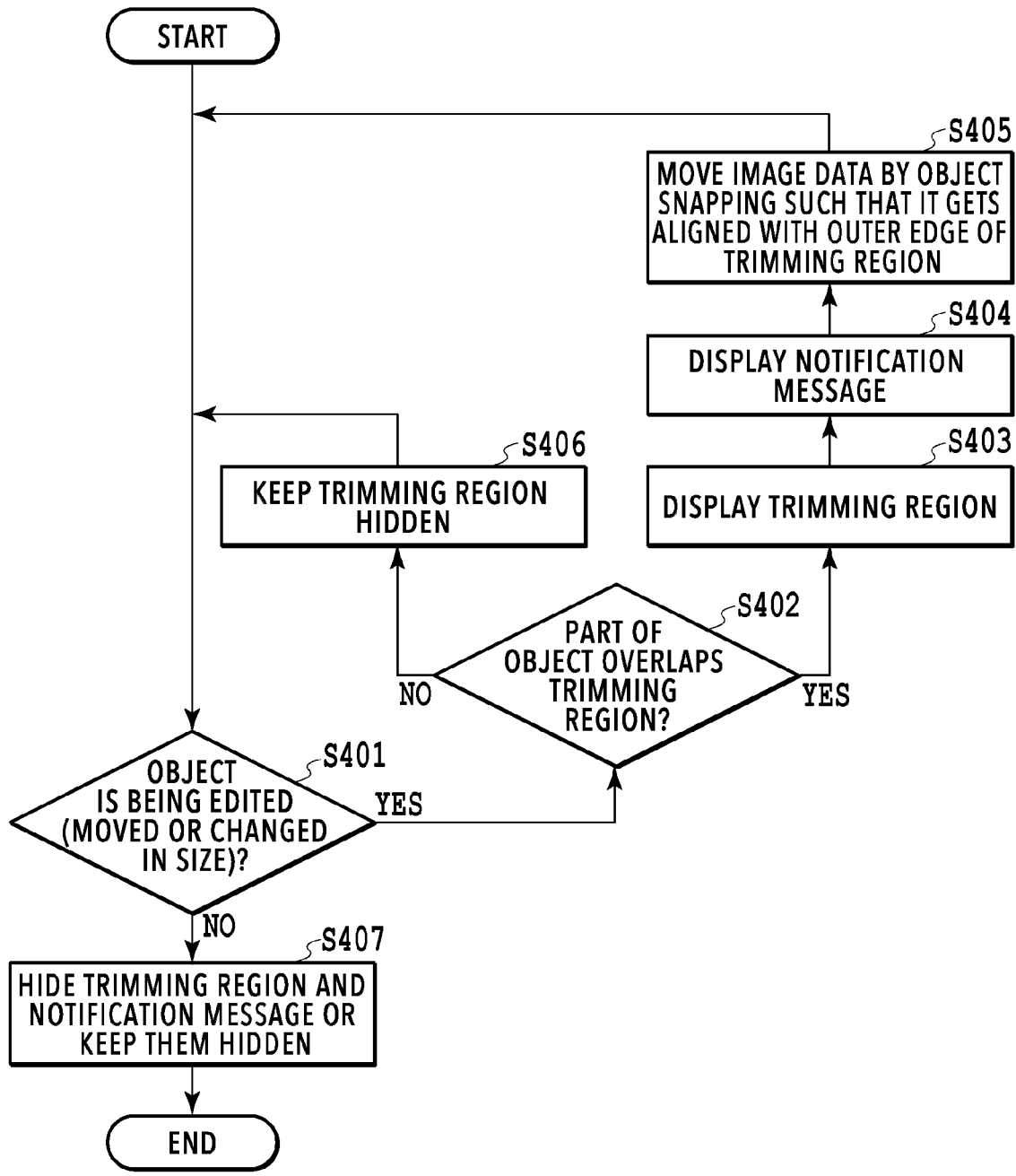
FIG. 14 is a flowchart illustrating a process in a fourth embodiment.

The switching of the display of the trimming region in the present embodiment will be described below using FIGS. 14 and 15A to 15E. FIG. 14 is a flowchart illustrating processing in the present embodiment, and FIGS. 15A to 15E illustrate an editing screen in the present embodiment. Note that the CPU 1011 executes each step in FIG. 14 by reading a program associated with the processing in the flowchart out of a memory and executing it. Incidentally, the series of processes by the album editing application 90 are the same as the processes in FIG. 3, and detailed description thereof is, therefore, omitted.

Figure 15A:
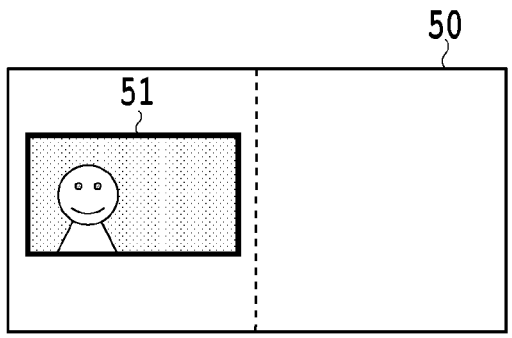
FIGS. 15A to 15E are diagrams illustrating an editing screen in the fourth embodiment.

In the case when the checkbox 82 in the environment setting screen 81 in FIG. 5 is not selected, the double-page spread region 50 is in a state where the trimming region 60 is hidden, as illustrated in FIG. 15A. Thus, the trimming region 60 is not unnecessarily displayed, so that the user's editing work will not be interrupted by the trimming region 60. The following description will be given by taking as an example a case when, to change the position of the image data 51 with the trimming region 60 hidden as above, the user selects the image data 51 and moves the selected image data 51 to re-place it.

In S401, the CPU 1011 determines whether the object in the double-page spread region 50 is being edited, e.g., whether the object is being moved, turned, or changed in size. In a case when the result of the determination in this step is positive, the flow proceeds to S402. In a case when the result of the determination in this step is negative, the flow proceeds to S407.

For example, in a case when the user selects the image data 51 in the editing screen 30, the CPU 1011 receives an instruction indicating that the user has selected the image data 51 as the editing target. The CPU 1011 then determines that the object in the double-page spread region 50 is being edited (YES in S401).

In S402, the CPU 1011 determines whether a part of the object being edited has overlapped the trimming region 60. In a case when the result of the determination in this step is positive, the flow proceeds to S403. In a case when the result of the determination in this step is negative, the flow proceeds to S406.

Figure 15B:
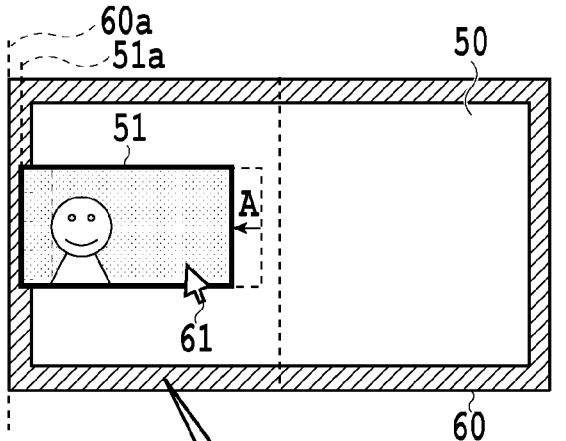

For example, in a case when the user is moving the image data 51 in the editing screen 30, the CPU 1011 determines in S402 whether the image data 51 and the trimming region 60 overlap each other. Note that the overlap determination in S402 is the same as that in the first embodiment, and a detailed description thereof is therefore omitted (see FIG. 9). Now, consider a case when, as illustrated in FIG. 15B, the user selects the image data 51 with the mouse cursor 61 and moves it in the direction A and, as a result, a part of the image data 51 overlaps the trimming region 60. In this case, the CPU 1011 determines that a part of the object being edited has overlapped the trimming region 60 (YES in S402).

In S403, the CPU 1011 displays the trimming region 60 while the image data 51 is moved.

In S404, the CPU 1011 displays a notification message 80. The notification message 80 indicates that the trimming region 60 is a reference region for performing marginless printing. By checking the notification message 80, the user can figure out the meaning of displaying the trimming region 60.

Figure 15C:
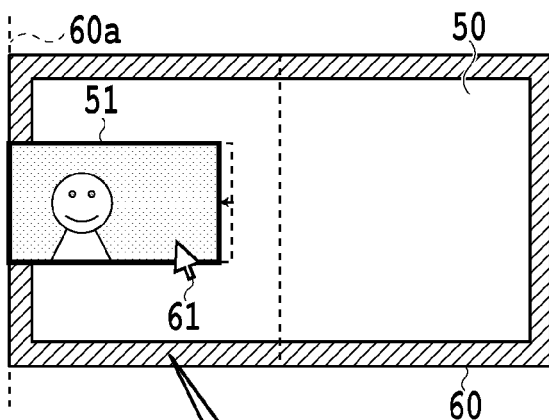

In S405, the CPU 1011 moves the image data 51 by object snapping such that the edge 51a of the image data 51 gets aligned with the edge 60a of the trimming region 60. Note that the object snapping is the same as that in the third embodiment, and detailed description thereof is therefore omitted. As a result of this step, the editing screen becomes as illustrated in FIG. 15C.

In S406, the CPU 1011 keeps the trimming region 60 hidden.

In S407, the CPU 1011 hides the trimming region 60 or keeps it hidden.

Figure 15D:
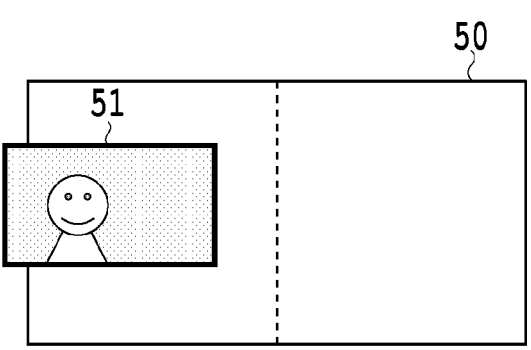
Figure 15E:
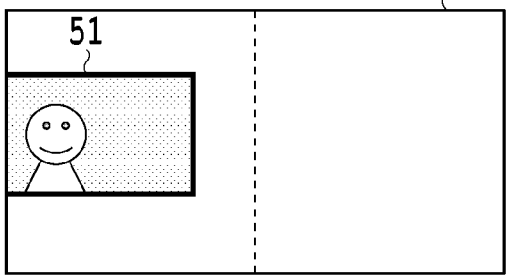

In a case when the user moves the image data 51 in the trimming region 60, the CPU 1011 repeats the processes of S401, S402, S403, S404, and S405 to keep displaying the trimming region 60 and the notification message 80 while the image data 51 is moved. Also, at the same time, the CPU 1011 moves the image data 51 such that the edge 51a of the image data 51 gets aligned with the edge 60a of the trimming region 60. Thereafter, the user places the image data 51 at a new position and unselects the image data 51. In response to this, the CPU 1011 receives the user instruction to unselect the image data 51 and hides the trimming region 60 and the notification message 80, as illustrated in FIG. 15D (NO in S401→S407). Incidentally, in a case when an ordering process is performed in the state illustrated in FIG. 15D and a trimming process or a folding process is performed by the post-processing apparatus 1400, an output as illustrated in FIG. 15E is obtained. Also, in a case when the part of the image data 51 stops overlapping the trimming region 60 while the user moves the image data 51, the CPU 1011 detects this and hides the trimming region 60 and the notification message 80 (NO in S402→S406). Specifically, in a case when the user unselects the image data 51 or the part of the selected image data 51 stops overlapping the trimming region 60, the CPU 1011 detects this and hides the trimming region 60 and the notification message 80. The above is a flow of the series of processes in the present embodiment.

Advantageous Effects of the Present Embodiment

As described above, in the present embodiment, the switching of the display of the trimming region, the switching of the display of the notification, and the layout of the image data are performed based on the position and editing state of the image data in the double-page spread region. In this way, the trimming region and the notification can be displayed only when they need to be and, at the same time, the image data can be moved such that an edge of the image data gets aligned with an outer edge of the trimming region. This can improve convenience for the user during editing work and assist marginless printing.

Fifth Embodiment

Next, a fifth embodiment will be described. The present embodiment is similar to the third embodiment but is different from the third embodiment in the trimming region to be displayed. Specifically, in the third embodiment, a trimming region corresponding to all four sides of a double-page spread is displayed. On the other hand, in the present embodiment, only a trimming region corresponding to the side overlapping image data is displayed.
<Realtime Switching of Display of Trimming Region>

Figure 16:
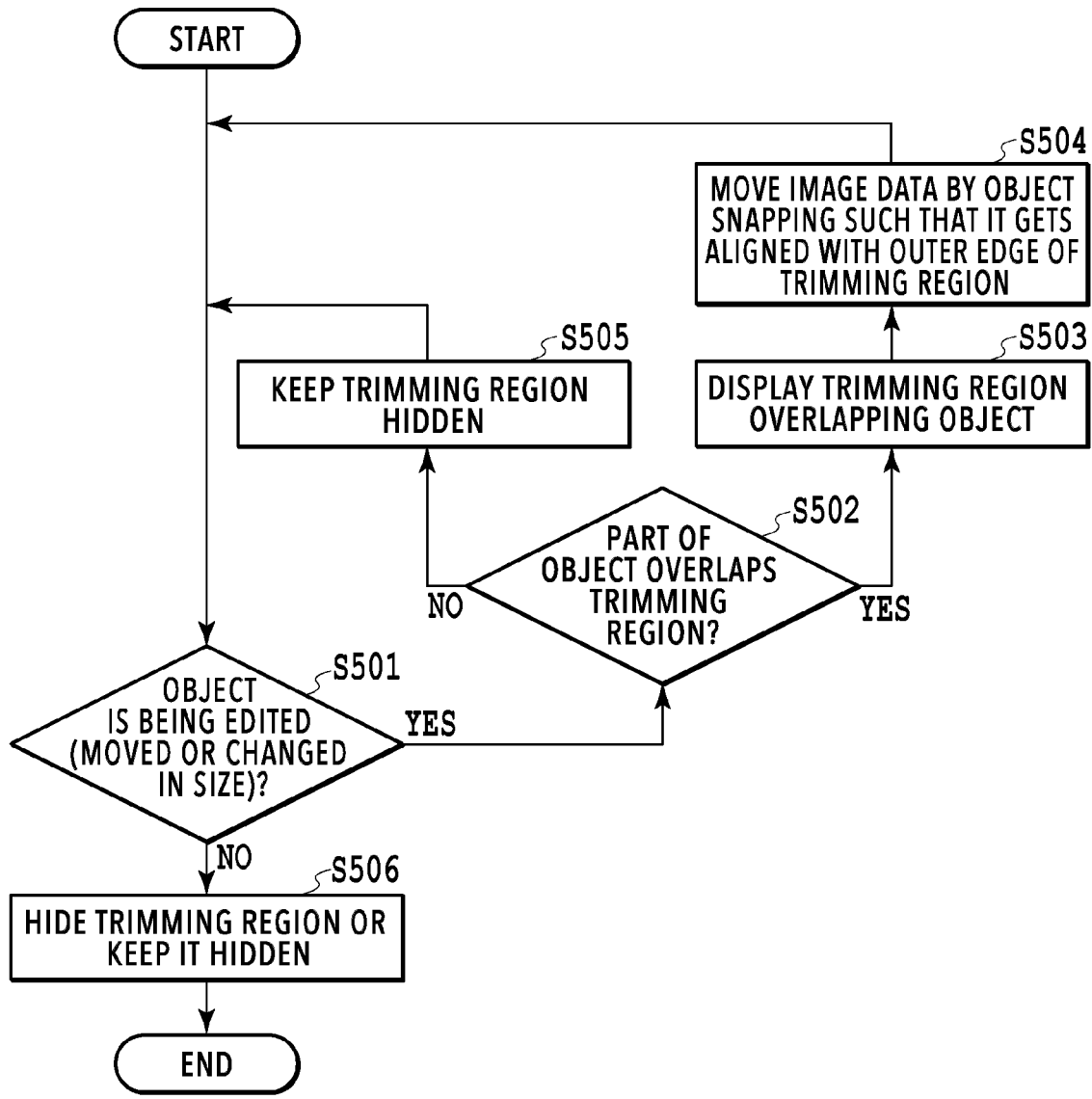
FIG. 16 is a flowchart illustrating a process in a fifth embodiment.

The switching of the display of the trimming region in the present embodiment will be described below using FIGS. 16 and 17A to 17E. FIG. 16 is a flowchart illustrating processing in the present embodiment, and FIGS. 17A to 17E illustrate an editing screen in the present embodiment. Note that the CPU 1011 executes each step in FIG. 16 by reading a program associated with the processing in the flowchart out of a memory and executing it. Incidentally, the series of processes by the album editing application 90 are the same as the processes in FIG. 3, and detailed description thereof is, therefore, omitted.

Figure 17A:
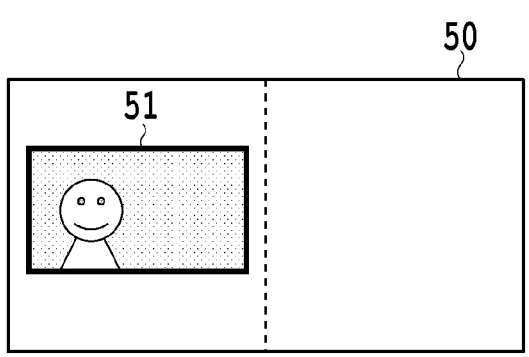
FIGS. 17A to 17E are diagrams illustrating an editing screen in the fifth embodiment.

In the case when the checkbox 82 in the environment setting screen 81 in FIG. 5 is not selected, the double-page spread region 50 is in a state where a trimming region 60 is hidden, as illustrated in FIG. 17A. Thus, the trimming region 60 is not unnecessarily displayed, so that the user's editing work will not be interrupted by the trimming region 60. The following description will be given by taking as an example a case when, to change the position of the image data 51 with the trimming region 60 hidden as above, the user selects the image data 51 and moves the selected image data 51 to re-place it.

In S501, the CPU 1011 determines whether the object in the double-page spread region 50 is being edited, e.g., whether the object is being moved, turned, or changed in size. In a case when the result of the determination in this step is positive, the flow proceeds to S502. In a case when the result of the determination in this step is negative, the flow proceeds to S506.

For example, in a case when the user selects the image data 51 in the editing screen 30, the CPU 1011 receives an instruction indicating that the user has selected the image data 51 as the editing target. The CPU 1011 then determines that the object in the double-page spread region 50 is being edited (YES in S501).

In S502, the CPU 1011 determines whether a part of the object being edited has overlapped the trimming region 60. In a case when the result of the determination in this step is positive, the flow proceeds to S503. In a case when the result of the determination in this step is negative, the flow proceeds to S505.

Figure 17B:
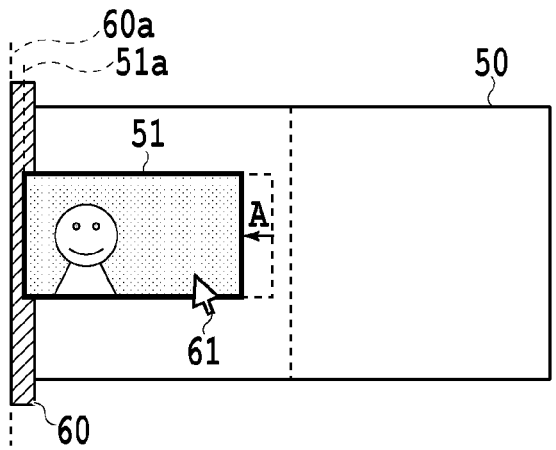

For example, in a case when the user is moving the image data 51 in the editing screen 30, the CPU 1011 determines in S502 whether the image data 51 and the trimming region 60 overlap each other. Note that the overlap determination in S502 is the same as that in the first embodiment, and a detailed description thereof is, therefore, omitted (see FIG. 9). Now, consider a case where, as illustrated in FIG. 17B, the user selects the image data 51 with the mouse cursor 61 and moves it in the direction A and, as a result, a part of the image data 51 overlaps the trimming region 60. In this case, the CPU 1011 determines that a part of the object being edited has overlapped the trimming region 60 (YES in S502).

In S503, while the image data 51 is moved, the CPU 1011 displays a trimming region 60 corresponding to the one or more sides among the four sides of the double-page spread region 50 overlapping the image data 51.

Figure 17C:
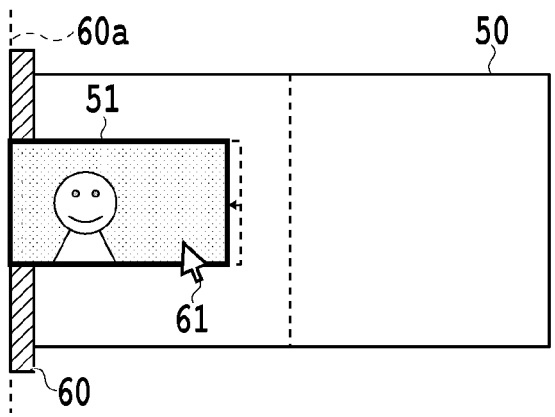

In S504, the CPU 1011 moves the image data 51 by object snapping such that the edge 51a of the image data 51 gets aligned with the edge 60a of the trimming region 60. Note that the object snapping is the same as that in the third embodiment, and detailed description thereof is therefore omitted. As a result of this step, the editing screen becomes as illustrated in FIG. 17C.

In S505, the CPU 1011 keeps the trimming region 60 hidden.

In S506, the CPU 1011 hides the trimming region 60 or keeps it hidden.

Figure 17D:
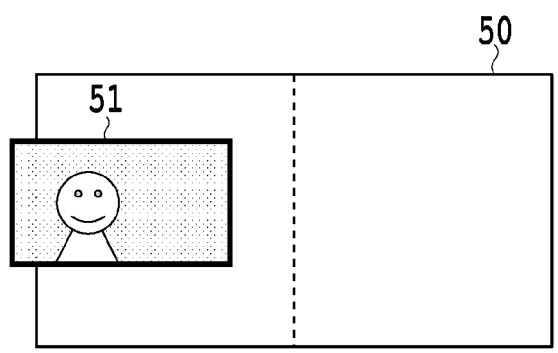
Figure 17E:
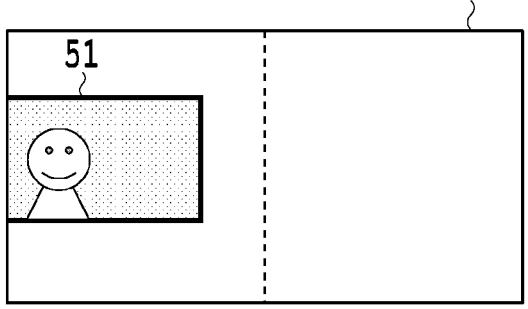

In a case when the user moves the image data 51 in the trimming region 60, the CPU 1011 repeats the processes of S501, S502, S503, and S504 to keep displaying the trimming region 60 corresponding to the one or more sides overlapping the image data 51 while the image data 51 is moved. Also, at the same time, the CPU 1011 moves the image data 51 such that the edge 51a of the image data 51 gets aligned with the edge 60a of the trimming region 60. Thereafter, the user places the image data 51 at a new position and unselects the image data 51. In response to this, the CPU 1011 receives the user instruction to unselect the image data 51 and hides the trimming region 60, as illustrated in FIG. 17D (NO in S501→S506). Incidentally, in a case when an ordering process is performed in the state illustrated in FIG. 17D and a trimming process or a folding process is performed by the post-processing apparatus 1400, an output as illustrated in FIG. 17E is obtained. Also, in a case when the part of the image data 51 stops overlapping the trimming region 60 while the user moves the image data 51, the CPU 1011 detects this and hides the trimming region 60 (NO in S502→S505). Specifically, in a case when the user unselects the image data 51 or the part of the selected image data 51 stops overlapping the trimming region 60, the CPU 1011 detects this and hides the trimming region 60. The above is a flow of the series of processes in the present embodiment.

Advantageous Effects of the Present Embodiment

As described above, in the present embodiment, the switching of the display of a partial trimming region and the layout of the image data are performed based on the position and editing state of the image data in the double-page spread region. In this way, a trimming region at a necessary portion can be displayed only when it needs to be and, at the same time, the image data can be moved such that an edge of the image data gets aligned with an outer edge of the trimming region. This can improve convenience for the user during editing work and assist marginless printing.

OTHER EMBODIMENTS

The album editing application 90 may have some or all of the functions of the five embodiments described above.

Also, in the five embodiments described above, a trimming region is displayed based on a determination of whether a part of an object overlaps the trimming region, but this overlap determination process may be omitted. That is, the trimming region may be displayed based solely on detection of a movement of the object and/or a change in its size.

Also, the embodiments described above are implemented by using the album editing application 90, but applications to which the idea of the present disclosure is applicable are not limited to album editing applications. For example, the idea of the present disclosure is applicable also to layout editing applications for newly arranging object data.

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or a Blu-ray Disc (BD)™), a flash memory device, a memory card, and the like.

According to the present disclosure, it is possible to improve convenience for a user to lay out image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A non-transitory computer readable storage medium storing a program that causes a computer to function as:
a display control unit capable of displaying a screen having a first region in which to place an object and a second region surrounding the first region, and configured to switch to displaying or to hiding the second region in the screen according to a setting indicating whether to display or to hide the second region,
wherein, even in a case when the setting indicates hiding the second region, the display control unit displays the second region based on a position of the object in the first region.

2. The readable storage medium according to claim 1, wherein,
in a case when the setting indicates displaying the second region, the second region is displayed regardless of the position of the object, and
in the case when the setting indicates hiding the second region, the second region is displayed depending on the position of the object.

3. The readable storage medium according to claim 2, wherein the object is an object that is being edited by a user via the screen.

4. The readable storage medium according to claim 3, wherein, in the case when the setting indicates hiding the second region, the display control unit displays the second region when a part of the object being edited overlaps the second region.

5. The readable storage medium according to claim 4, wherein
the first region has a rectangular shape, and
the second region to be displayed by the display control unit in the case where the setting indicates hiding the second region is a region corresponding to a side among four sides of the rectangular shape which overlaps the object being edited.

6. The readable storage medium according to claim 4, wherein the editing is moving the object, turning the object, or changing a size of the object.

7. The readable storage medium according to claim 4, wherein the computer is caused to further function as an object snapping unit configured to move the object being edited such that an edge of the object being edited gets aligned with an outer edge of the second region.

8. The readable storage medium according to claim 1, wherein, if the display control unit displays the second region, even in the case when the setting indicates hiding the second region, the display control unit displays a predetermined message along with the second region.

9. The readable storage medium according to claim 1, wherein
the first region is a double-page spread region, and
the second region is a region to be trimmed in printing or a region to be used by being folded back in bookbinding of a cover.

10. The readable storage medium according to claim 1, wherein the object is image data.

11. An information processing apparatus comprising:
a display control unit capable of displaying a screen having a first region in which to place an object and a second region surrounding the first region, and configured to switch to displaying or to hiding the second region in the screen according to a setting indicating whether to display or to hide the second region,
wherein, even in a case when the setting indicates hiding the second region, the display control unit displays the second region based on a position of the object in the first region.

12. A method of controlling an information processing apparatus including a display control unit capable of displaying a screen having a first region in which to place an object and a second region surrounding the first region, and configured to switch to displaying or to hiding the second region in the screen according to a setting indicating whether to display or to hide the second region, the method comprising:
even in a case when the setting indicates hiding the second region, causing the display control unit to display the second region based on a position of the object in the first region.

13. The control method according to claim 12, wherein,
in a case when the setting indicates displaying the second region, the second region is displayed regardless of the position of the object, and
in the case when the setting indicates hiding the second region, the second region is displayed depending on the position of the object.

14. The control method according to claim 13, wherein the object is an object that is being edited by a user via the screen.

15. The control method according to claim 14, wherein, in the case when the setting indicates hiding the second region, the display control unit displays the second region when a part of the object being edited overlaps the second region.

16. The control method according to claim 15, wherein
the first region has a rectangular shape, and
the second region to be displayed by the display control unit in the case where the setting indicates hiding the second region is a region corresponding to a side among four sides of the rectangular shape which overlaps the object being edited.

17. The control method according to claim 15, wherein the editing is moving the object, turning the object, or changing a size of the object.

18. The control method according to claim 15, wherein
the information processing apparatus further includes an object snapping unit configured to move the object being edited such that an edge of the object being edited gets aligned with an outer edge of the second region.

19. The control method according to claim 12, wherein if the display control unit displays the second region even in the case where the setting indicates hiding the second region, the display control unit displays a predetermined message along with the second region.

20. The control method according to claim 12, wherein
the first region is a double-page spread region, and
the second region is a region to be trimmed in printing or a region to be used by being folded back in bookbinding of a cover.

21. The control method according to claim 12, wherein the object is image data.

* * * * *